United States Patent
Li (10) Patent No.: US 12,308,969 B2
(45) Date of Patent: May 20, 2025

(54) METHOD AND APPARATUS FOR SENDING HYBRID AUTOMATIC REPEAT REQUEST ACKNOWLEDGEMENT INFORMATION, AND STORAGE MEDIUM

(71) Applicant: Beijing Xiaomi Mobile Software Co., Ltd., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 5 days.

(21) Appl. No.: 17/768,364

(22) PCT Filed: Oct. 14, 2019

(86) PCT No.: PCT/CN2019/111002
§ 371 (c)(1),
(2) Date: Apr. 12, 2022

(87) PCT Pub. No.: WO2021/072590
PCT Pub. Date: Apr. 22, 2021

(65) Prior Publication Data
US 2024/0113814 A1    Apr. 4, 2024

(51) Int. Cl.
*H04L 1/1812* (2023.01)
*H04W 72/0446* (2023.01)
*H04W 72/21* (2023.01)
*H04W 72/232* (2023.01)

(52) U.S. Cl.
CPC ....... *H04L 1/1812* (2013.01); *H04W 72/0446* (2013.01); *H04W 72/21* (2023.01); *H04W 72/232* (2023.01)

(58) Field of Classification Search
CPC ... H04L 1/1812; H04L 1/1861; H04L 1/1854; H04L 5/00; H04W 72/0446; H04W 72/21; H04W 72/232
See application file for complete search history.

(56) References Cited

U.S. PATENT DOCUMENTS

| | | |
|---|---|---|
| 2018/0324787 A1 | 11/2018 | Yin et al. |
| 2019/0081762 A1 | 3/2019 | Yang et al. |
| 2019/0230683 A1 | 7/2019 | Akkarakaran et al. |
| 2022/0150942 A1* | 5/2022 | Xu ................. H04W 72/0446 |
| 2022/0303063 A1* | 9/2022 | Mu ..................... H04L 5/0055 |

FOREIGN PATENT DOCUMENTS

CN    110311762 A    10/2019

OTHER PUBLICATIONS

Vivo. "R1-1904082 UCI enhancements for URLLC" 3GPP TSG RAN WG1 #96bis, Apr. 3, 2019, sections 2.2-2.3.
Oppo. "R1-1903605 Summary of offline discussion on UCI enhancements for URLLC" 3GPP TSG RAN WG1 #96, Mar. 3, 2019, entire document.

* cited by examiner

*Primary Examiner* — Diane L Lo
(74) *Attorney, Agent, or Firm* — Volpe Koenig (57) ABSTRACT

A method for sending hybrid automatic repeat request acknowledgement (HARQ-ACK) information includes: obtaining at least two PUCCHs carrying HARQ-ACK information respectively belonging to different sub-slots; and in response to determining that the at least two PUCCHs carrying the HARQ-ACK information satisfy a multiplexing condition, multiplexing at least two pieces of carried HARQ-ACK information onto PUCCH resources of a target sub-slot in at least two different sub-slots.

11 Claims, 5 Drawing Sheets

METHOD AND APPARATUS FOR SENDING HYBRID AUTOMATIC REPEAT REQUEST ACKNOWLEDGEMENT INFORMATION, AND STORAGE MEDIUM

CROSS REFERENCE TO RELATED APPLICATION

The present application is a U.S. National Stage of International Application No. PCT/CN2019/111002, filed on Oct. 14, 2019, the contents of all of which are incorporated herein by reference in their entireties for all purposes.

BACKGROUND

With the rapid development of 5G technology, 5G ultra reliable and low latency communication (URLLC) service has become one of the important business types.

In the URLLC service, in order to ensure low latency, a physical downlink shared channel (PDSCH) is generally used to separately correspond to a piece of hybrid automatic repeat request acknowledgement (HARQ-ACK) information. At present, there is no solution in the industry about how to multiplex HARQ-ACK information when a plurality of physical uplink control channel (PUCCH) resources carrying the HARQ-ACK information configured in a sub-slot level are overlapped.

SUMMARY

The present disclosure relates to the technical field of mobile communications, in particular to a method and apparatus for sending hybrid automatic repeat request acknowledgement information, and a storage medium.

According to a first aspect of the present disclosure, a method for sending hybrid automatic repeat request acknowledgement information is provided. The method includes:
  obtaining at least two physical uplink control channels (PUCCHs) carrying hybrid automatic repeat request acknowledgement (HARQ-ACK) information, wherein the at least two PUCCHs carrying the HARQ-ACK information overlap each other and respectively belong to different sub-slots; and
  in response to determining that the at least two PUCCHs carrying the HARQ-ACK information satisfy a timing sequence condition for multiplexing, multiplexing at least two pieces of HARQ-ACK information onto PUCCH resources of a target sub-slot in at least two different sub-slots.

According to a second aspect of the present disclosure, an apparatus for sending hybrid automatic repeat request acknowledgement information is provided. The apparatus includes:
  a processor and a memory configured to store instructions executable by the processor.
  The processor is configured to:
  obtain at least two physical uplink control channels (PUCCHs) carrying hybrid automatic repeat request acknowledgement (HARQ-ACK) information, wherein the at least two PUCCHs carrying the HARQ-ACK information overlap each other and respectively belong to different sub-slots; and
  multiplex at least two pieces of HARQ-ACK information onto PUCCH resources of a target sub-slot in at least two different sub-slots in response to determining that the at least two PUCCHs carrying the HARQ-ACK information satisfy a timing sequence condition for multiplexing.

According to a third aspect of the present disclosure, a non-transitory computer-readable storage medium is provided. The storage medium stores at least one instruction, at least one program, a code set or an instruction set. The at least one instruction, the at least one program, the code set or the instruction set is loaded and executed by a processor to implement the method for sending hybrid automatic repeat request acknowledgement information according to the above first aspect or any one of optional solutions of the first aspect.

It is to be understood that the foregoing general description and the following detailed description are examples merely and do not limit the present disclosure.

BRIEF DESCRIPTION OF THE DRAWINGS

The accompanying drawings, which are incorporated in and constitute a part of the specification, illustrate embodiments consistent with the present disclosure and, together with the specification, serve to explain the principles of the present disclosure.

DETAILED DESCRIPTION

Examples will be described in detail herein, instances of which are illustrated in the accompanying drawings. When the following description refers to the drawings, the same numerals in different drawings refer to the same or similar elements unless otherwise indicated. The implementations described in the examples below are not intended to represent all implementations consistent with the present disclosure. Rather, they are merely instances of apparatus and methods consistent with some aspects of the present disclosure, as recited in the appended claims.

It should be understood that "several" referred to herein refers to one or more, and "a plurality" refers to two or more. "And/or", which describes the association relationship of associated objects, means that there may be three kinds of relationships, for example, A and/or B, may mean that A exists alone, A and B exist at the same time, and B exists alone. The character "/" generally indicates that the associated objects are an "or" relationship.

The present disclosure provides a method for sending hybrid automatic repeat request acknowledgement information. The method for sending hybrid automatic repeat request acknowledgement information is executed by user equipment and may realize multiplexing of PUCCHs configured in a sub-slot level. The method for sending hybrid automatic repeat request acknowledgement information involved in the embodiment of the present disclosure will be described in detail below with reference to the accompanying drawings.

First, some terms involved in the present disclosure are explained.

1) User Equipment (UE)

In a universal mobile communication system, a terminal is referred to as UE. In the embodiment of the present disclosure, the user equipment may be a mobile phone, a smart terminal, a multimedia device, a streaming media device, and so on.

Figure 1:
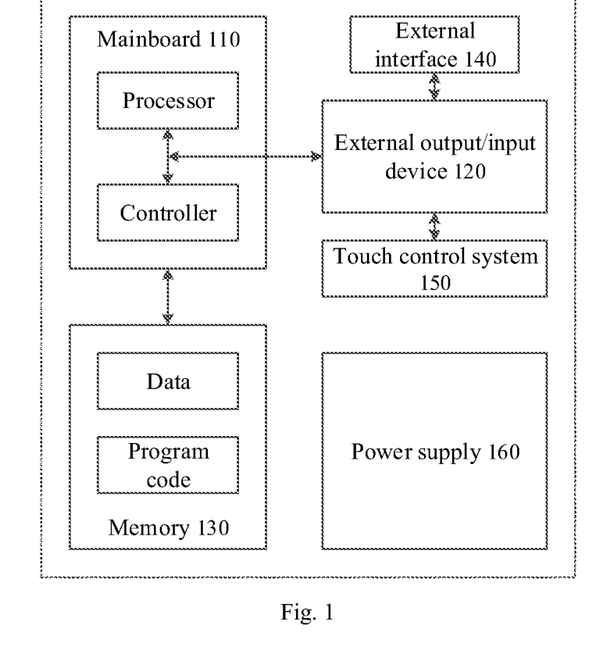
FIG. 1 is a schematic structural diagram of user equipment provided by an example of the present disclosure.

For example, please refer to FIG. 1, which is a schematic structural diagram of user equipment provided by an example of the present disclosure. As shown in FIG. 1, the user equipment includes a mainboard 110, an external output/input device 120, a memory 130, an external interface 140, a touch control system 150 and a power supply 160.

The mainboard 110 is integrated with processing elements such as a processor and a controller.

The external output/input device 120 may include a display component (such as a display screen), a sound playback component (such as a speaker), a sound collection component (such as a microphone), various keys, and so on.

The memory 130 stores program codes and data.

The external interface 140 may include a headphone interface, a charging interface, a data interface, and so on.

The touch control system 150 may be integrated in the display component or keys of the external output/input device 120, and the touch control system 150 is configured to detect touch operations performed by a user on the display component or keys.

The power supply 160 is configured to supply power to other components in the terminal.

In the embodiment of the present disclosure, the processor in the mainboard 110 may generate interface content by executing or calling the program codes and data stored in the memory, and the generated interface content is displayed through the external output/input device 120. In the process of displaying the interface content, touch operations performed when the user interacts with an interface may be detected through the capacitive touch control system 150, and pressing or other operations, such as gesture operations and voice operations, performed when the user interacts with the interface may also be detected through the external output/input device 120.

2) 5G Ultra Reliable and Low Latency Communication (5G URLLC)

5G URLLC is one of the three major application scenarios of 5G, with new features such as high reliability, low latency, and extremely high availability. 5G URLLC is widely considered by the industry to be applicable to industrial control, factory automation, smart grids, equipment, Internet of Vehicles communications, remote surgeries and other scenarios.

3) A Physical Downlink Shared Channel (PDSCH)

The PDSCH is configured to schedule and transmit downlink data, and may carry different transmission content (i.e., different logical channels) from upper layers, including paging information, broadcast information, control information, service data information, etc.

4) Hybrid Automatic Repeat Request Acknowledgement (HARQ-ACK)

A hybrid automatic repeat request (HARQ) is a technology formed by combining forward error correction coding (FEC) and an automatic repeat request (ARQ). At a receiving end, FEC technology is used to correct the part of all errors that may be corrected. Data packets with errors that may not be corrected are determined through error detection, and are discarded, and a transmitting end is requested to resend the same data packets.

5) A Physical Uplink Control Channel (PUCCH)

The PUCCH is configured to carry uplink control information (UCI). The UCI includes: a scheduling request (SR), HARQ-ACK, and channel state information (CSI).

A PUCCH resource set may correspondingly carry a certain quantity of uplink control information payloads (UCI payloads), and the ranges of UCI payloads that may be correspondingly carried by different PUCCH resources do not overlap each other. In existing protocols, for PUCCH resource configuration in slot-level, a UCI payload corresponding to a PUCCH resource set 0 is 1~2 bits, a UCI payload corresponding to a PUCCH resource set 1 is 2~N1 bits, a UCI payload corresponding to a PUCCH resource set 2 is N1+1~N2 bits, and a UCI payload corresponding to a PUCCH resource set 3 is N2+1~1706 bits, where N1 or N2 is a value that may be configured by a base station. A PUCCH resource may have a total of 5 formats from formats 0 to 4, and may be divided into two categories: long format and short format. The quantity of time domain symbols occupied by a long format PUCCH resource is 4 to 14, and the quantity of time domain symbols occupied by a short format PUCCH resource is 1~2.

Figure 2:
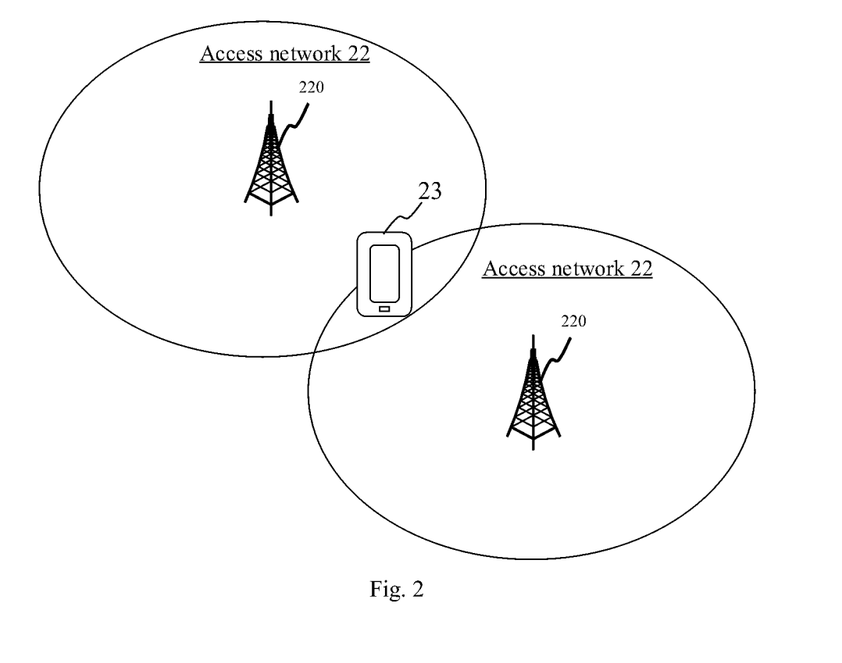
FIG. 2 is a block diagram of a communication system provided by an example of the present disclosure.

FIG. 2 is a block diagram of a communication system provided by an example of the present disclosure. The communication system may include: an access network 22 and a terminal 23.

The access network 22 includes several access network devices 220. The access network devices 220 may be base stations. The base stations are apparatuses deployed in the access network to provide a wireless communication function for the terminal. The base stations may include various forms of macro base stations, micro base stations, relay stations, access points and so on. In systems using different wireless access technologies, the names of devices with base station functions may vary. In the 5th generation mobile communication (5G), which is also referred to as a new radio (NR) system, the device with base station functions is referred to evolved Node B (eNodeB or eNB). As communication technologies evolve, the description of "base station" may change. For convenience, in the embodiments of the present disclosure, the above apparatuses for providing the terminal 23 with the wireless communication function are collectively referred to as access network devices.

The terminal 23 may include various handheld devices with wireless communication functions, vehicle-mounted devices, wearable devices, computing devices or other processing devices connected to a wireless modem, as well as various forms of user equipment, mobile stations (MS), terminal devices, etc. For the convenience of description, the devices mentioned above are collectively referred to as terminals. The access network devices 220 and the terminal 23 communicate with each other through a certain air interface technology, such as a Uu interface (an interface between the user equipment and a UMTS terrestrial radio access network).

The International Telecommunication Union (ITU) divides services in the 5G network into three categories. The first category is enhanced Mobile Broadband (eMMB), which is a type of 5G services dedicated to mobile devices such as mobile phones. The second category is URLLC, which will mainly be used for industrial use and autonomous vehicles. The third category is massive Machine Type Communications (mMTC), which is a type of service that may be used in the "Internet of Things" and "Internet of Everything" scenarios, and the benefit of which is that a large quantity of adjacent devices may enjoy smooth communication connection.

The URLLC service usually requires very high reliability and very low latency, and the eMBB service type usually requires a higher rate, but does not require very low latency and very low error rate. As a result, in comparison, the priority of the URLLC service type may be higher. When the time/frequency domain resources of their air interfaces conflict, the transmission of the URLLC service is guaranteed first, and the UE is notified through the downlink control instruction. This mechanism enables URLLC data to be sent with a fairly high priority, improving the reliability of URLLC transmission.

Figure 3:
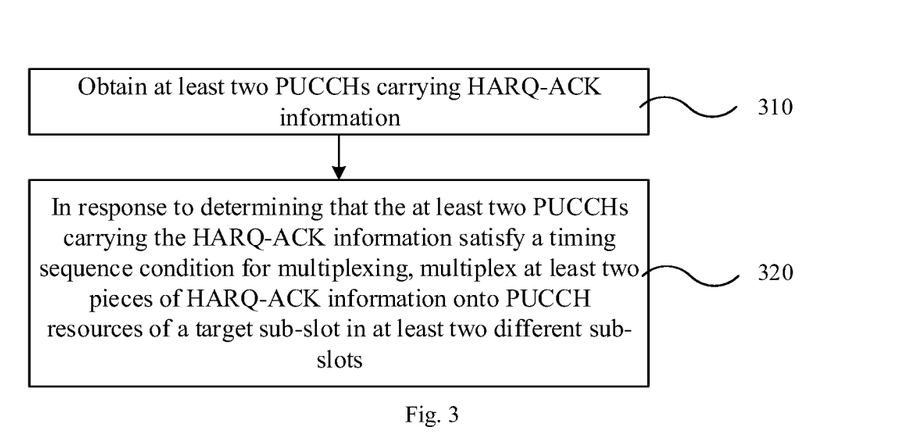
FIG. 3 is a flow diagram of a method for sending hybrid automatic repeat request acknowledgement information according to an example.

FIG. 3 is a flow diagram of a method for sending hybrid automatic repeat request acknowledgement information according to an example. The method for sending hybrid automatic repeat request acknowledgement information is executed by user equipment, for example, the user equipment may be user equipment as shown in FIG. 1. As shown in FIG. 3, the method for sending hybrid automatic repeat request acknowledgement information includes:

Step 310, at least two PUCCHs carrying HARQ-ACK information are obtained. The at least two PUCCHs carrying the HARQ-ACK information overlap each other and respectively belong to different sub-slots.

The above different sub-slots belong to the same slot. That is, a system divides a slot into a plurality of sub-slots, and each sub-slot corresponds to an opportunity to send HARQ-ACK information, such that the time latency for sending HARQ-ACK information is shortened.

In the embodiment of the present disclosure, each sub-slot may be configured with PUCCH resources by a base station. The PUCCH resources configured in each sub-slot may be the same or different, and each sub-slot may be configured with a maximum of 4 PUCCH resource sets. There are a plurality of PUCCH resources in each PUCCH resource set, and the plurality of PUCCH resources may be distinguished by PUCCH resource IDs.

In one possible implementation, at least two PUCCHs carrying HARQ-ACK information in different sub-slots are in the same slot, or in two adjacent slots.

Figure 4:
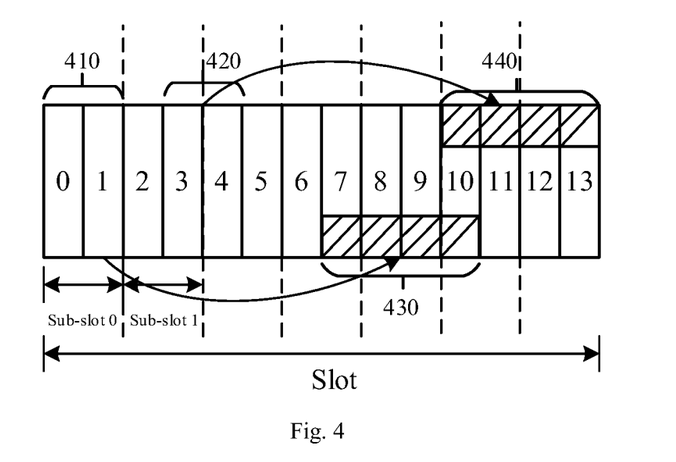
FIG. 4 is a schematic diagram of obtaining at least two PUCCHs carrying HARQ-ACK information provided by an example of the present disclosure.

Please refer to FIG. 4, which is a schematic diagram of obtaining the at least two PUCCHs carrying the HARQ-ACK information provided by an example of the present disclosure. As shown in FIG. 4, taking multiplexing of two PUCCHs belonging to different sub-slots as an example, the system divides a slot containing 14 time domain symbols into 7 sub-slots, and each sub-slot contains 2 time domain symbols, where a URLLC PDSCH1 (410) belongs to a sub-slot 0, a URLLC PDSCH2 (420) belongs to a sub-slot 1, HARQ-ACK1 information (430) belongs to a sub-slot 3, and HARQ-ACK2 information (440) belongs to a sub-slot 5. A PUCCH of the HARQ-ACK1 information (430) corresponding to the URLLC PDSCH1 (410) and a PUCCH of the HARQ-ACK2 information (440) corresponding to the URLLC PDSCH2 (420) overlap in a time domain.

Step 320, in response to determining that the at least two PUCCHs carrying the HARQ-ACK information satisfy a timing sequence condition for multiplexing, at least two pieces of HARQ-ACK information are multiplexed onto PUCCH resources of a target sub-slot in at least two different sub-slots.

In response to determining that the PUCCH carrying the HARQ-ACK1 information (430) and the PUCCH carrying the HARQ-ACK2 information (440) shown in FIG. 4 satisfy the timing condition for multiplexing, the user equipment may multiplex the two HARQ-ACK information onto the PUCCH resources of the target sub-slot in the two different sub-slots, that is, the HARQ-ACK information carried on the different PUCCHs is multiplexed together, and the multiplexed HARQ-ACK information is carried onto PUCCH resources of one of the two PUCCHs.

In one possible implementation, the target sub-slot is a sub-slot with the earliest start time among the at least two different sub-slots, such that the multiplexed HARQ-ACK information may be sent as early as possible.

In one possible implementation, before the at least two pieces of HARQ-ACK information are multiplexed onto the PUCCH resources of the target sub-slot in the at least two different sub-slots in response to determining that the at least two PUCCHs carrying the HARQ-ACK information satisfy the timing sequence condition for multiplexing, the method further includes:

a target PUCCH resource set is determined from each PUCCH resource set corresponding to the target sub-slot according to a quantity of bits of the at least two pieces of HARQ-ACK information; and a target resource is determined from the target PUCCH resource set according to an indication for PUCCH resources in target downlink control information (DCI). The target DCI is one of DCI respectively corresponding to the at least two pieces of HARQ-ACK information.

In one possible implementation, the target DCI is DCI with the latest sending time among the DCI respectively corresponding to the at least two pieces of HARQ-ACK information.

In one possible implementation, the at least two PUCCHs carrying the HARQ-ACK information satisfying the timing sequence condition for multiplexing includes:

when the at least two PUCCHs carrying the HARQ-ACK information overlap in pairs on sub-slots, a first time domain position and a second time domain position are obtained, where the first time domain position is a latest end symbol position of end symbol positions of at least two PDSCHs corresponding to the at least two pieces of HARQ-ACK information, and the second time domain position is an earliest start symbol position in the at least two PUCCHs carrying the HARQ-ACK information; and in response to determining that the first time domain position precedes the second time domain position and an interval between the first time domain position and the second time domain position is not less than an interval threshold, it is determined that the at least two PUCCHs carrying the HARQ-ACK information satisfy the timing sequence condition for multiplexing.

In one possible implementation, the method further includes:

in response to determining that the at least two PUCCHs carrying the HARQ-ACK information do not satisfy the timing sequence condition for multiplexing, HARQ-ACK information corresponding to other sub-slots except a first sub-slot in the at least two different sub-slots is discarded.

In one possible implementation, the first sub-slot is a sub-slot with the earliest start time among the at least two sub-slots.

To sum up, in the method for sending hybrid automatic repeat request acknowledgement information, a solution for multiplexing the HARQ-ACK information when the plurality of PUCCH resources carrying the HARQ-ACK information configured in a sub-slot level are overlapped is provided by obtaining the at least two PUCCHs carrying the HARQ-ACK information that respectively belong to different sub-slots, and in response to determining that the at least two PUCCHs carrying the HARQ-ACK information satisfy the multiplexing condition, multiplexing the at least two pieces of carried HARQ-ACK information onto the PUCCH resources of the target sub-slot in the at least two different sub-slots, such that a case where the PUCCHs overlap in a time domain is avoided.

Figure 5:
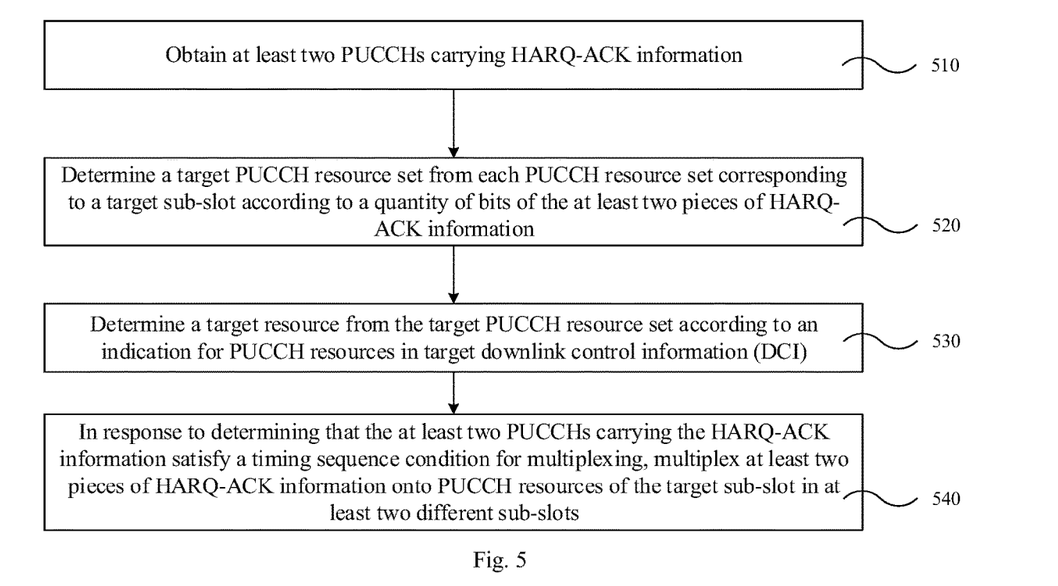
FIG. 5 is a flow diagram of a method for sending hybrid automatic repeat request acknowledgement information according to an example.

In conjunction with the solutions shown in FIG. 3 and FIG. 4, please refer to FIG. 5, which is a flow diagram of a method for sending hybrid automatic repeat request acknowledgement information according to an example. The method for sending hybrid automatic repeat request acknowledgement information is executed by user equipment, for example, the user equipment may be the user equipment shown in FIG. 1. As shown in FIG. 5, the method for sending hybrid automatic repeat request acknowledgement information includes:

Step 510, at least two PUCCHs carrying HARQ-ACK information are obtained. The at least two PUCCHs carrying the HARQ-ACK information overlap each other and respectively belong to different sub-slots.

For the implementation process of step 510 above, reference may be made to the relevant description in the above embodiment shown in FIG. 3, which will not be repeated here.

Step 520, in response to determining that the at least two PUCCHs carrying the HARQ-ACK information satisfy a timing sequence condition for multiplexing, a target PUCCH resource set is determined from each PUCCH resource set corresponding to a target sub-slot according to a quantity of bits of at least two pieces of HARQ-ACK information.

In one possible implementation, the target sub-slot is a sub-slot with the earliest start time among at least two different sub-slot.

For example, as shown in FIG. 4, the URLLC PDSCH1 (410) belongs to the sub-slot 0, and the URLLC PDSCH2 (420) belongs to the sub-slot 1. In response to determining that the PUCCH of the HARQ-ACK1 information (430) corresponding to the URLLC PDSCH1 (410) and the PUCCH of the HARQ-ACK2 information (440) corresponding to the URLLC PDSCH2 (420) satisfy the timing sequence condition for multiplexing, the user equipment may use the sub-slot 0 as the target sub-slot since a start time of the sub-slot 0 is earlier than a start time of the sub-slot 1.

In one possible implementation, when the at least two PUCCHs carrying the HARQ-ACK information overlap in pairs on sub-slots, a first time domain position and a second time domain position are obtained. The first time domain position is a latest end symbol position of end symbol positions of at least two PDSCHs corresponding to the at least two pieces of HARQ-ACK information. The second time domain position is an earliest start symbol position in the at least two PUCCHs carrying the HARQ-ACK information.

Figure 6:
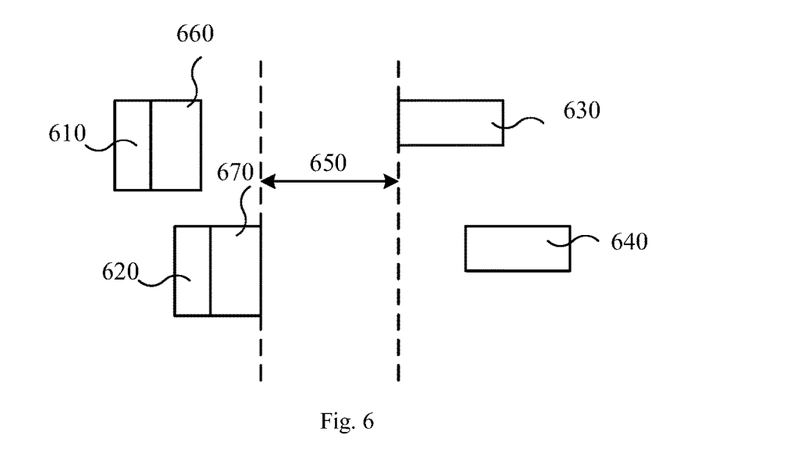
FIG. 6 is a schematic diagram of a method for determining target resource provided by an example of the present disclosure.

In response to determining that the first time domain position precedes the second time domain position and an interval between the first time domain position and the second time domain position is not less than an interval threshold, it is determined that the at least two PUCCHs carrying the HARQ-ACK information satisfy the timing sequence condition for multiplexing. Please refer to FIG. 6, which is a schematic diagram of resource positions provided by an example of the present disclosure. As shown in FIG. 6, an end symbol position of a PDSCH2 (670) is later than an end symbol position of a PDSCH2 (660), such that the end symbol position of the PDSCH2 (670) is determined as the first time domain position; and a start symbol position of a PUCCH carrying HARQ-ACK1 information (630) precedes a start symbol position of a PUCCH carrying HARQ-ACK2 information (640), such that the start symbol position of the PUCCH carrying the HARQ-ACK1 information (630) is determined as the second time domain position.

In response to determining that the time interval $T_1$ between the first time domain position and the second time domain position is greater than or equal to a predefined multiplexing time interval T, that is, in response to determining that a time interval 650 between the first time domain position and the second time domain position in FIG. 6 is greater than or equal to the predefined multiplexing time interval T, it is determined that the two PUCCHs carrying the HARQ-ACK information shown in FIG. 6 satisfy the timing sequence condition for multiplexing.

The predefined multiplexing time interval T is predefined in a protocol, and may be related to parameters such as a sub-carrier interval.

Figure 7:
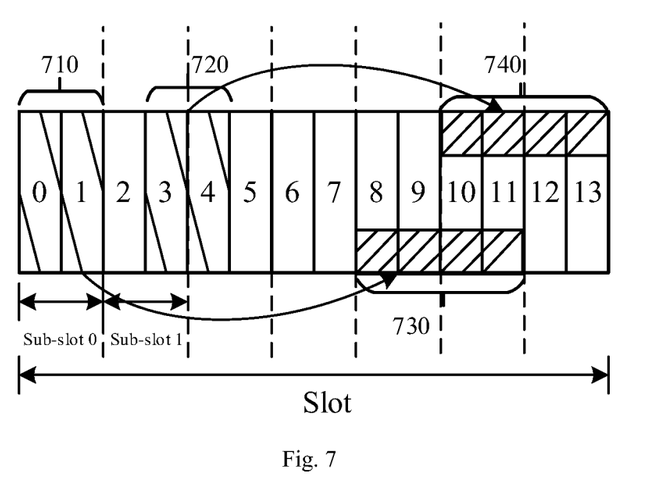
FIG. 7 is a schematic diagram of determining whether PUCCHs of HARQ-ACK information satisfy a timing sequence condition for multiplexing provided by an example of the present disclosure.

Please refer to FIG. 7, which is a schematic diagram of determining whether PUCCHs of HARQ-ACK information satisfy the timing sequence condition for multiplexing provided by an example of the present disclosure. As shown in FIG. 7, taking multiplexing of two PUCCHs belonging to different sub-slots as an example, the system divides a slot containing 14 time domain symbols into 7 sub-slots, and each sub-slot contains 2 time domain symbols, where a URLLC PDSCH1 (710) belongs to the sub-slot 0, a URLLC PDSCH2 (720) belongs to the sub-slot 1, HARQ-ACK1 information (730) belongs to a sub-slot 4, and HARQ-ACK2 information (740) belongs to the sub-slot 5. The PUCCH of the HARQ-ACK1 information (730) corresponding to the URLLC PDSCH1 (710) and the PUCCH of the HARQ-ACK2 information (740) corresponding to the URLLC PDSCH2 (720) overlap in a time domain, but belong to different channels.

The first time domain position refers to an end symbol position of the URLLC PDSCH2 (720), the second time domain position refers to a start symbol position of the PUCCHs carrying the HARQ-ACK1 information (730), and a time interval $T_1$ between the first time domain position and the second time domain position is 3 symbols. Assuming that the multiplexing time interval T is 3 symbols, the two pieces of HARQ-ACK information shown in FIG. 7 satisfy the timing sequence conditions for multiplexing, so that the UE may multiplex the two pieces of HARQ-ACK information, and the multiplexed HARQ-ACK information is carried onto a target resource determined in step 530, that is, the UE may select one PUCCH resource from a plurality of PUCCH resources configured in the sub-slot 4 to which the HARQ-ACK1 information (730) belongs, and the multiplexed HARQ-ACK information may be carried onto the PUCCH resource.

In the embodiment of the present disclosure, one HARQ-ACK codebook may include the quantity of bits of HARQ-ACK information of one or more PDCCHs, and the UE selects a corresponding PUCCH resource set based on the quantity of bits of the HARQ-ACK information in the HARQ-ACK codebook.

Step 530, the target resource is determined from the target PUCCH resource set according to an indication for PUCCH resources in target downlink control information (DCI). The target DCI is one of DCI respectively corresponding to the at least two pieces of HARQ-ACK information.

In one possible implementation, the target DCI is DCI with the latest sending time among the DCI respectively corresponding to the at least two pieces of HARQ-ACK information.

As shown in FIG. 6, the HARQ-ACK1 information (630) corresponds to DCI1 (610), the HARQ-ACK2 information (640) corresponds to DCI2 (620), and DCI1 and DCI2 have indications for corresponding PUCCH resources. In order that a base station may flexibly change an indicated specific PUCCH resource ID in the DCI with the latest sending time, the user equipment may select the DCI with the latest sending time as the target DCI. For example, in FIG. 6, the sending time of the DCI2 is later than the sending time of the DCI1, so that the user equipment may select the DCI2 as the target DCI, and determine the target resource from the target PUCCH resource set according to the indication for PUCCH resources in the DCI2.

In one possible implementation, the target DCI is DCI with the earliest sending time among the DCI respectively corresponding to the at least two pieces of HARQ-ACK information, so that the user equipment may transmit the HARQ-ACK information as early as possible to avoid unnecessary latency.

Step 540, the at least two pieces of HARQ-ACK information are multiplexed onto PUCCH resources of the target sub-slot in the at least two different sub-slots.

In one possible implementation, in response to determining that the at least two PUCCHs carrying the HARQ-ACK information do not satisfy the timing sequence condition for multiplexing, HARQ-ACK information corresponding to other sub-slots except a first sub-slot in the at least two different sub-slots is discarded.

In one possible implementation, the first sub-slot is a sub-slot with the earliest start time among the at least two sub-slots.

As shown in FIG. 4, according to the above description, the first time domain position in FIG. 4 refers to an end symbol position of the URLLC PDSCH2 (420), and the second time domain position refers to the start symbol position of the PUCCH carrying the HARQ-ACK1 information, the time interval $T_1$ between the two is 2 symbols. Assuming that the multiplexing time interval T is 3 symbols, the two pieces of HARQ-ACK information shown in FIG. 4 do not satisfy the timing sequence condition for multiplexing. At this time, the UE may transmit the HARQ-ACK information in the sub-slot with the earlier transmission time, that is, the sub-slot 0 where the HARQ-ACK1 information is located is the first sub-slot, and the UE may transmit the HARQ-ACK1 information and discard the HARQ-ACK2 information overlapping the HARQ-ACK1 information.

Figure 8:
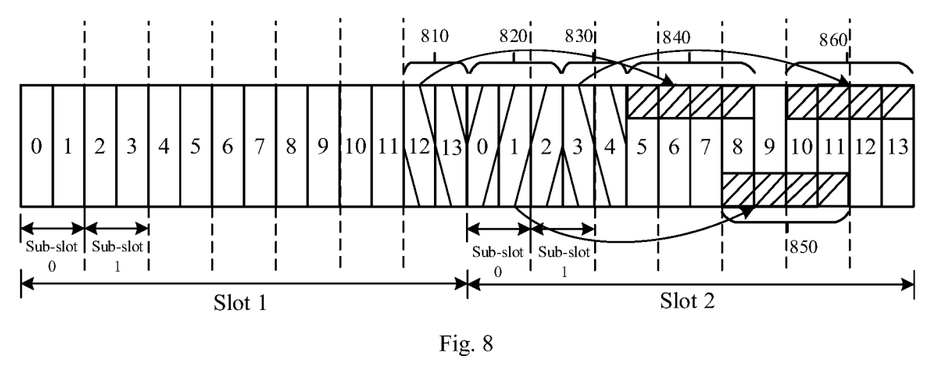
FIG. 8 is a schematic diagram of determining whether PUCCHs of HARQ-ACK information satisfy a timing sequence condition for multiplexing provided by an example of the present disclosure.

Please refer to FIG. 8, which is a schematic diagram of determining whether PUCCHs of HARQ-ACK information satisfy the timing sequence condition for multiplexing provided by an example of the present disclosure. As shown in FIG. 8, taking multiplexing of three PUCCHs belonging to different sub-slots as an example, the system divides the two slots containing 14 time domain symbols into 7 sub-slots, and each sub-slot contains 2 time domain symbols, where a URLLC PDSCH1 (810) belongs to a sub-slot 6 of a slot 1, a URLLC PDSCH2 (820) belongs to a sub-slot 0 of a slot 2, a URLLC PDSCH2 (830) belongs to a sub-slot 1 of the slot 2, HARQ-ACK1 information (840) belongs to a sub-slot 2 of the slot 2, HARQ-ACK2 information (850) belongs to a sub-slot 4 of the slot 2, and HARQ-ACK3 information (860) belongs to a sub-slot 5 of the slot 2. A PUCCH of the HARQ-ACK1 information (840) corresponding to the URLLC PDSCH1 (810) and a PUCCH of the HARQ-ACK2 information (850) corresponding to the URLLC PDSCH2 (820) overlap in a time domain, and the PUCCH of the HARQ-ACK2 information (850) corresponding to the URLLC PDSCH2 (820) and a PUCCH of the HARQ-ACK3 information (860) corresponding to the URLLC PDSCH3 (830) overlap in a time domain.

In the case as shown in FIG. 8, the user equipment first determines whether a first PUCCH and a PUCCH overlapping the first PUCCH satisfy the timing sequence condition for multiplexing. In response to determining that the timing sequence condition for multiplexing is satisfied, HARQ-ACK information carried by the two channels is multiplexed, and the multiplexed HARQ-ACK information is carried onto a target resource in the earliest sub-slot among sub-slots. In response to determining that the timing sequence condition for multiplexing condition is not satisfied, the HARQ-ACK information in a sub-slot with an earlier transmission time in the HARQ-ACK information carried by the two channels is transmitted, and the HARQ-ACK2 information overlapping with the transmitted HARQ-ACK information may be discarded.

When a PUCCH carrying the multiplexed HARQ-ACK information does not overlap a PUCCH carrying third HARQ-ACK information, the third HARQ-ACK information may still be transmitted. When the PUCCH carrying the multiplexed HARQ-ACK information overlaps the PUCCH carrying the third HARQ-ACK information, the steps in FIG. 5 above may be continued.

That is, the UE first determines whether the PUCCH carrying the HARQ-ACK1 information (840) and the PUCCH carrying the HARQ-ACK2 information (850) satisfy the timing sequence condition for multiplexing. In response to determining that the timing sequence condition for multiplexing is satisfied, the UE multiplexes the HARQ-ACK information carried by the two channels, and carries the multiplexed HARQ-ACK information onto a target resource in PUCCH resources configured in the sub-slot 6 of the slot 1 to which the HARQ-ACK1 information (840) belongs. In response to determining that the multiplexing condition is not satisfied, the UE may transmit the HARQ-ACK1 information (840), and discard the HARQ-ACK2 information (850) overlapping the HARQ-ACK1 information (840).

When the PUCCH carrying the multiplexed HARQ-ACK information does not overlap the PUCCH carrying the HARQ-ACK3 information (860), the HARQ-ACK3 information (860) may still be transmitted. When the PUCCH carrying the multiplexed HARQ-ACK information overlaps the PUCCH carrying the HARQ-ACK3 information (860), the steps in FIG. 5 above may be continued.

In a possible case, when a plurality of (for example, 3 or more) channels carrying HARQ-ACK information overlap in pairs, the user equipment determines whether the plurality of channels carrying the HARQ-ACK information satisfy the timing sequence condition for multiplexing together. If yes, a plurality of HARQ-ACK information is multiplexed to the target resource in the plurality of PUCCH resources configured in the earliest sub-slot among the sub-slots. If not, only HARQ-ACK information with the earliest sub-slot is transmitted, HARQ-ACK information overlapping with the transmitted HARQ-ACK information may be discarded.

Figure 9:
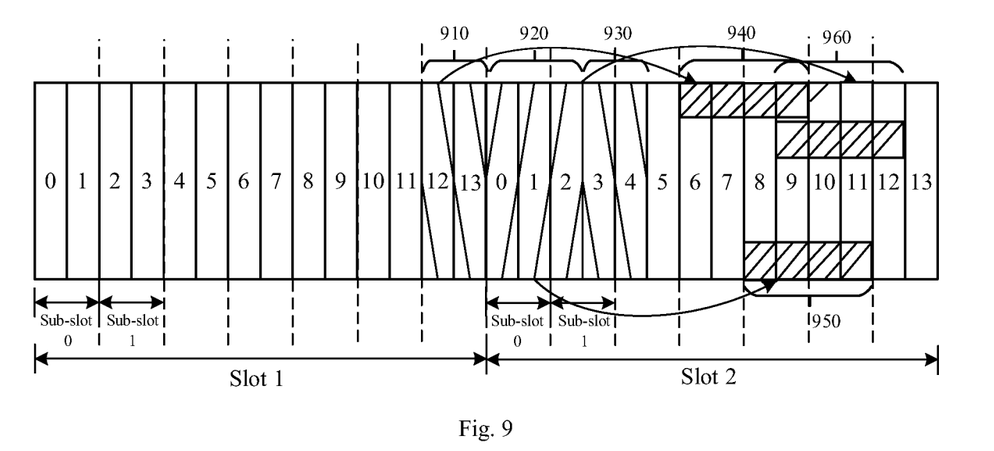
FIG. 9 is a schematic diagram of determining whether PUCCHs of HARQ-ACK information satisfy a timing sequence condition for multiplexing provided by another example of the present disclosure.

For example, please refer to FIG. 9, which is a schematic diagram of determining whether PUCCHs of HARQ-ACK information satisfy the timing sequence condition for multiplexing provided by an example of the present disclosure. As shown in FIG. 9, taking multiplexing of three PUCCHs belonging to different sub-slots as an example, the system divides the two slots containing 14 time domain symbols into 7 sub-slots, and each slot contains 2 time domain symbols, where a URLLC PDSCH1 (910) belongs to the sub-slot 6 of the slot 1, a URLLC PDSCH2 (920) belongs to the sub-slot 0 of the slot 2, a URLLC PDSCH2 (930) belongs to the sub-slot 1 of the slot 2, HARQ-ACK1 information (940) belongs to the sub-slot 3 of the slot 2, HARQ-ACK2 information (950) belongs to the sub-slot 4 of the slot 2, HARQ-ACK3 information (960) belongs to the sub-slot 4 of the slot 2. A PUCCH of the HARQ-ACK1 information (940) corresponding to the URLLC PDSCH1 (910), a PUCCH of the HARQ-ACK2 information (950) corresponding to the URLLC PDSCH2 (920), and a PUCCH of the HARQ-ACK3 information (960) corresponding to the URLLC PDSCH3 (930) overlap in pairs in a time domain.

In the case shown in FIG. 9, the UE determines whether the channels respectively carrying the HARQ-ACK1 information (940), HARQ-ACK2 information (950) and HARQ-ACK3 information (960) satisfy the timing sequence condition for multiplexing together. If yes, the UE multiplexes the HARQ-ACK1 information (940), the HARQ-ACK2 information (950) and the HARQ-ACK3 information (960), and carries the multiplexed HARQ-ACK information onto a target resource in PUCCH resources configured in the sub-slot 6 of the slot 1 to which the HARQ-ACK1 information (940) belongs. If not, the UE may transmit the HARQ-ACK1 information (940), and discard the HARQ-ACK2 information (950) and HARQ-ACK3 information (960) overlapping the HARQ-ACK1 information (940).

To sum up, in the method for sending hybrid automatic repeat request acknowledgement information, a solution for multiplexing the HARQ-ACK information when the plurality of PUCCH resources carrying the HARQ-ACK information configured in a sub-slot level are overlapped is provided by obtaining the at least two PUCCHs carrying the HARQ-ACK information that respectively belong to different sub-slots, and in response to determining that the at least two PUCCHs carrying the HARQ-ACK information satisfy the multiplexing condition, multiplexing the at least two pieces of carried HARQ-ACK information onto the PUCCH resources of the target sub-slot in the at least two different sub-slots, such that a case where the PUCCHs overlap in a time domain is avoided.

Figure 10:
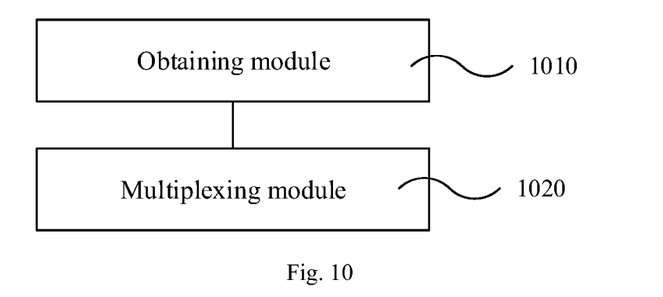
FIG. 10 is a structural block diagram of an apparatus for sending hybrid automatic repeat request acknowledgement information according to an example.

FIG. 10 is a structural block diagram of an apparatus for sending hybrid automatic repeat request acknowledgement information according to an example. The apparatus for sending hybrid automatic repeat request acknowledgement information is applied to user equipment to perform all or part of the steps of the above method according to any embodiment of FIG. 3 or FIG. 5. The above user equipment may be the user equipment as shown in FIG. 1. As shown in FIG. 10, the apparatus for sending hybrid automatic repeat request acknowledgement information may include:

- an obtaining module 1010, configured to obtain at least two physical uplink control channels (PUCCHs) carrying hybrid automatic repeat request acknowledgement (HARQ-ACK) information, where the at least two PUCCHs carrying the HARQ-ACK information overlap each other and respectively belong to different sub-slots; and
- a multiplexing module 1020, configured to multiplex at least two pieces of HARQ-ACK information onto PUCCH resources of a target sub-slot in at least two different sub-slots in response to determining that the at least two PUCCHs carrying the HARQ-ACK information satisfy a timing sequence condition for multiplexing.

In one possible implementation, the target sub-slot is a sub-slot with the earliest start time among the at least two different sub-slots.

In one possible implementation, the apparatus further includes:

- a first determining module, configured to determine, before the multiplexing module 1020 multiplexes the at least two pieces of HARQ-ACK information onto the PUCCH resources of the target sub-slot in the at least two different sub-slots in response to determining that the at least two PUCCHs carrying the HARQ-ACK information satisfy the timing sequence condition for multiplexing, a target PUCCH resource set from each PUCCH resource set corresponding to the target sub-slot according to a quantity of bits of the at least two pieces of HARQ-ACK information; and
- a second determining module, configured to determine a target resource from the target PUCCH resource set according to an indication for PUCCH resources in target downlink control information (DCI). The target DCI is one of DCI respectively corresponding to the at least two pieces of HARQ-ACK information.

In one possible implementation, the target DCI is DCI with the latest sending time among the DCI respectively corresponding to the at least two pieces of HARQ-ACK information.

In one possible implementation, the multiplexing module 1020 includes:

- a first obtaining sub-module, configured to obtain, when the at least two PUCCHs carrying the HARQ-ACK information overlap in pairs on sub-slots, a first time domain position and a second time domain position, where the first time domain position is a latest end symbol position of end positions of at least two PDSCHs corresponding to the at least two pieces of HARQ-ACK information, and the second time domain position is an earliest symbol position in the at least two PUCCHs carrying the HARQ-ACK information; and
- a first determining sub-module, configured to determine that the at least two PUCCHs carrying the HARQ-ACK information satisfy the timing sequence condition for multiplexing in response to determining that the first time domain position precedes the second time domain position and an interval between the first time domain position and the second time domain position is not less than an interval threshold.

In one possible implementation, the apparatus further includes:

a discarding module, configured to discard HARQ-ACK information corresponding to other sub-slots except a first sub-slot in the at least two different sub-slots in response to determining that the at least two PUCCHs carrying the HARQ-ACK information do not satisfy the timing sequence condition for multiplexing.

In one possible implementation, the first sub-slot is a sub-slot with the earliest start time among the at least two sub-slots.

To sum up, in the apparatus for sending hybrid automatic repeat request acknowledgement information, a solution for multiplexing the HARQ-ACK information when the plurality of PUCCH resources carrying the HARQ-ACK information configured in a sub-slot level are overlapped is provided by obtaining the at least two PUCCHs carrying the HARQ-ACK information that respectively belong to different sub-slots, and in response to determining that the at least two PUCCHs carrying the HARQ-ACK information satisfy the multiplexing condition, multiplexing the at least two pieces of carried HARQ-ACK information onto the PUCCH resources of the target sub-slot in the at least two different sub-slots, such that a case where the PUCCHs overlap in a time domain is avoided.

An example of the present disclosure provides an apparatus for sending hybrid automatic repeat request acknowledgement information, which is able to implement all or part of the steps of the above method according to any one of the embodiments of FIG. 3 or FIG. 5 of the present disclosure. The apparatus for sending hybrid automatic repeat request acknowledgement information includes: a processor, and a memory configured to store instructions executable by the processor.

The processor is configured to:

obtain at least two physical uplink control channels (PUCCHs) carrying hybrid automatic repeat request acknowledgement (HARQ-ACK) information, where the at least two PUCCHs carrying the HARQ-ACK information overlap each other and respectively belong to different sub-slots; and multiplex at least two pieces of HARQ-ACK information onto PUCCH resources of a target sub-slot in at least two different sub-slots in response to determining that the at least two PUCCHs carrying the HARQ-ACK information satisfy a timing sequence condition for multiplexing.

In one possible implementation, the target sub-slot is a sub-slot with the earliest start time among the at least two different sub-slots.

In one possible implementation, before the at least two pieces of HARQ-ACK information are multiplexed onto the PUCCH resources of the target sub-slot in the at least two different sub-slots in response to determining that the at least two PUCCHs carrying the HARQ-ACK information satisfy the timing sequence condition for multiplexing, the method further includes:

a target PUCCH resource set is determined from each PUCCH resource set corresponding to the target sub-slot according to a quantity of bits of the at least two pieces of HARQ-ACK information; and a target resource is determined from the target PUCCH resource set according to an indication for PUCCH resources in target downlink control information (DCI). The target DCI is one of DCI respectively corresponding to the at least two pieces of HARQ-ACK information.

In one possible implementation, the target DCI is DCI with the latest sending time among the DCI respectively corresponding to the at least two pieces of HARQ-ACK information.

In one possible implementation, determining whether the at least two PUCCHs carrying the HARQ-ACK information satisfy the timing sequence condition for multiplexing includes:

when the at least two PUCCHs carrying the HARQ-ACK information overlap in pairs on sub-slots, a first time domain position and a second time domain position are obtained, where the first time domain position is a latest end symbol position of end symbol positions of at least two PDSCHs corresponding to the at least two pieces of HARQ-ACK information, and the second time domain position is an earliest start symbol position in the at least two PUCCHs carrying the HARQ-ACK information; and in response to determining that the first time domain position precedes the second time domain position and an interval between the first time domain position and the second time domain position is not less than an interval threshold, it is determined that the at least two PUCCHs carrying the HARQ-ACK information satisfy the timing sequence condition for multiplexing.

In one possible implementation, the method further includes:

in response to determining that the at least two PUCCHs carrying the HARQ-ACK information do not satisfy the timing sequence condition for multiplexing, HARQ-ACK information corresponding to other sub-slots except a first sub-slot in the at least two different sub-slots is discarded.

In one possible implementation, the first sub-slot is a sub-slot with the earliest start time among the at least two sub-slots.

Figure 11:
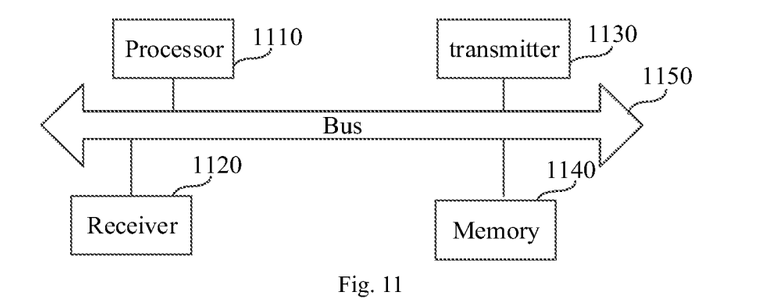
FIG. 11 is a schematic structural diagram of user equipment provided by an example of the present disclosure.

FIG. 11 is a schematic structural diagram of user equipment provided by an example of the present disclosure. The user equipment includes: a processor 1110, a receiver 1120, a transmitter 1130, a memory 1140, and a bus 1150.

The processor 1110 includes one or more processing cores, and the processor 1110 executes various functional applications and information processing by running software programs and modules.

The receiver 1120 and the transmitter 1130 may be implemented as a communication component, which may be a communication chip.

The memory 1140 is coupled to the processor 1110 through the bus 1150.

The memory 1140 may be configured to store at least one instruction, and the processor 1110 is configured to execute the at least one instruction, so as to implement the steps in the above method embodiments.

Furthermore, the memory 1140 may be implemented by any type of volatile or non-volatile storage devices or the combination of them. The volatile or non-volatile storage devices include but not limited to: magnetic or compact disks, electrically erasable programmable read only memories (EEPROMs), erasable programmable read only memories (EPROMs), static random access memories (SRAMs), read only memories (ROMs), magnetic memories, flash memories, and programmable read only memories (PROMs).

In an example, a computer-readable storage medium is further provided, in which at least one instruction, at least one program, a code set or an instruction set is stored. The method for sending hybrid automatic repeat request acknowledgement information executed by user equipment provided by the above method embodiments is implemented by loading and executing the at least one instruction, the at least one program, the code set or the instruction set by a processor.

Those of ordinary skill in the art can understand that all or part of the steps for implementing the above embodiments may be completed by hardware, or may be completed by instructing relevant hardware through a program. The program may be stored in a computer-readable storage medium. The storage medium mentioned above may be a read only memory, a magnetic disk or a compact disk, and so on.

The foregoing is only optional embodiments of the present disclosure, and is not intended to limit the present disclosure. Any modification, equivalent replacement, improvement, etc. made within the spirit and principles of the present disclosure shall fall within the scope of the present disclosure.

Other embodiments of the present disclosure will readily occur to those skilled in the art upon consideration of the specification and practice of the invention disclosed herein. The present disclosure is intended to cover any variations, uses, or adaptations of the present disclosure that follow the general principles of the present disclosure and include common knowledge or techniques in the technical field not disclosed by the present disclosure. The specification and embodiments are to be regarded as illustrative only, with the true scope and spirit of the present disclosure being indicated by the following claims.

It is to be understood that the present disclosure is not limited to the precise structures described above and illustrated in the accompanying drawings, and that various modifications and changes may be made without departing from the scope of the present disclosure. The scope of the present disclosure is limited only by the appended claims.

What is claimed is:

1. A method for sending hybrid automatic repeat request acknowledgement information, comprising:
   obtaining at least two physical uplink control channels (PUCCHs) carrying hybrid automatic repeat request acknowledgement (HARQ-ACK) information, wherein the at least two PUCCHs carrying the HARQ-ACK information overlap each other and respectively belong to different sub-slots;
   multiplexing at least two pieces of HARQ-ACK information onto a target PUCCH resource of a target sub-slot in at least two different sub-slots in response to determining that the at least two PUCCHs carrying the HARQ-ACK information satisfy a timing sequence condition for multiplexing, wherein the target sub-slot is a sub-slot with the earliest start time among the at least two different sub-slots;
   before multiplexing at least two pieces of HARQ-ACK information onto the target PUCCH resource of the target sub-slot in at least two different sub-slots in response to determining that the at least two PUCCHs carrying the HARQ-ACK information satisfy the timing sequence condition for multiplexing, the method further comprises:
   determining a target PUCCH resource set from each PUCCH resource set corresponding to the target sub-slot according to a quantity of bits of the at least two pieces of HARQ-ACK information; and
   determining the target PUCCH resource from the target PUCCH resource set according to an indication for PUCCH resources in target downlink control information (DCI), wherein the target DCI is one of DCI respectively corresponding to the at least two pieces of HARQ-ACK information, and the target DCI is DCI with an earliest sending time among the DCI respectively corresponding to the at least two pieces of HARQ-ACK information.

2. The method according to claim 1, wherein determining the at least two PUCCHs carrying the HARQ-ACK information satisfy the timing sequence condition for multiplexing comprises:
   obtaining, when the at least two PUCCHs carrying the HARQ-ACK information overlap in pairs on sub-slots, a first time domain position and a second time domain position, wherein the first time domain position is a latest end symbol position of end symbol positions of at least two PDSCHs corresponding to the at least two pieces of HARQ-ACK information, and the second time domain position is an earliest start symbol position in the at least two PUCCHs carrying the HARQ-ACK information; and
   in response to determining that the first time domain position precedes the second time domain position and an interval between the first time domain position and the second time domain position is not less than an interval threshold, determining that the at least two PUCCHs carrying the HARQ-ACK information satisfy the timing sequence condition for multiplexing.

3. The method according to claim 1, further comprising:
   in response to determining that the at least two PUCCHs carrying the HARQ-ACK information do not satisfy the timing sequence condition for multiplexing, discarding HARQ-ACK information corresponding to other sub-slots except a first sub-slot in the at least two different sub-slots.

4. The method according to claim 3, wherein the first sub-slot is a sub-slot with the earliest start time among the at least two sub-slots.

5. An apparatus for sending hybrid automatic repeat request acknowledgement information, comprising:
   a processor and a memory configured to store instructions executable by the processor; wherein
   the processor is configured to:
   obtain at least two physical uplink control channels (PUCCHs) carrying hybrid automatic repeat request acknowledgement (HARQ-ACK) information, wherein the at least two PUCCHs carrying the HARQ-ACK information overlap each other and respectively belong to different sub-slots;
   multiplex at least two pieces of HARQ-ACK information onto PUCCH a target PUCCH resource of a target sub-slot in at least two different sub-slots in response to determining that the at least two PUCCHs carrying the HARQ-ACK information satisfy a timing sequence condition for multiplexing, wherein the target sub-slot is a sub-slot with the earliest start time among the at least two different sub-slots;
   before multiplexing at least two pieces of HARQ-ACK information onto the target PUCCH resource of the target sub-slot in at least two different sub-slots in response to determining that the at least two PUCCHs carrying the HARQ-ACK information satisfy the timing sequence condition for multiplexing, determine a target PUCCH resource set from each PUCCH resource set corresponding to the target sub-slot according to a quantity of bits of the at least two pieces of HARQ-ACK information; and
   determine the target PUCCH resource from the target PUCCH resource set according to an indication for PUCCH resources in target downlink control information (DCI), wherein the target DCI is one of DCI respectively corresponding to the at least two pieces of HARQ-ACK information, and the target DCI is DCI with an earliest sending time among the DCI respectively corresponding to the at least two pieces of HARQ-ACK information.

6. The apparatus according to claim 5, wherein the processor is further configured to:
obtain, when the at least two PUCCHs carrying the HARQ-ACK information overlap in pairs on sub-slots, a first time domain position and a second time domain position, wherein the first time domain position is a latest end symbol position of end symbol positions of at least two PDSCHs corresponding to the at least two pieces of HARQ-ACK information, and the second time domain position is an earliest start symbol position in the at least two PUCCHs carrying the HARQ-ACK information; and
determine that the at least two PUCCHs carrying the HARQ-ACK information satisfy the timing sequence condition for multiplexing in response to determining that the first time domain position precedes the second time domain position and an interval between the first time domain position and the second time domain position is not less than an interval threshold.

7. The apparatus according to claim 5, wherein the processor is further configured to:
discard HARQ-ACK information corresponding to other sub-slots except a first sub-slot in the at least two different sub-slots in response to determining that the at least two PUCCHs carrying the HARQ-ACK information do not satisfy the timing sequence condition for multiplexing.

8. The apparatus according to claim 7, wherein the first sub-slot is a sub-slot with the earliest start time among the at least two sub-slots.

9. A non-transitory computer-readable storage medium, storing at least one instruction, at least one program, a code set or an instruction set, wherein the at least one instruction, the at least one program, the code set or the instruction set is loaded and executed by a processor to:
obtain at least two physical uplink control channels (PUCCHs) carrying hybrid automatic repeat request acknowledgement (HARQ-ACK) information, wherein the at least two PUCCHs carrying the HARQ-ACK information overlap each other and respectively belong to different sub-slots;
multiplex at least two pieces of HARQ-ACK information onto a target PUCCH resource of a target sub-slot in at least two different sub-slots in response to determining that the at least two PUCCHs carrying the HARQ-ACK information satisfy a timing sequence condition for multiplexing, wherein the target sub-slot is a sub-slot with the earliest start time among the at least two different sub-slots;
before multiplexing at least two pieces of HARQ-ACK information onto the target PUCCH resource of the target sub-slot in at least two different sub-slots in response to determining that the at least two PUCCHs carrying the HARQ-ACK information satisfy the timing sequence condition for multiplexing, determine a target PUCCH resource set from each PUCCH resource set corresponding to the target sub-slot according to a quantity of bits of the at least two pieces of HARQ-ACK information; and
determine the target PUCCH resource from the target PUCCH resource set according to an indication for PUCCH resources in target downlink control information (DCI), wherein the target DCI is one of DCI respectively corresponding to the at least two pieces of HARQ-ACK information, and the target DCI is DCI with an earliest sending time among the DCI respectively corresponding to the at least two pieces of HARQ-ACK information.

10. The non-transitory computer-readable storage medium according to claim 9, wherein the at least one instruction, the at least one program, the code set or the instruction set is loaded and executed by the processor to:
obtain, when the at least two PUCCHs carrying the HARQ-ACK information overlap in pairs on sub-slots, a first time domain position and a second time domain position, wherein the first time domain position is a latest end symbol position of end symbol positions of at least two PDSCHs corresponding to the at least two pieces of HARQ-ACK information, and the second time domain position is an earliest start symbol position in the at least two PUCCHs carrying the HARQ-ACK information; and
determine that the at least two PUCCHs carrying the HARQ-ACK information satisfy the timing sequence condition for multiplexing in response to determining that the first time domain position precedes the second time domain position and an interval between the first time domain position and the second time domain position is not less than an interval threshold.

11. The non-transitory computer-readable storage medium according to claim 9, wherein the at least one instruction, the at least one program, the code set or the instruction set is loaded and executed by the processor to:
discard HARQ-ACK information corresponding to other sub-slots except a first sub-slot in the at least two different sub-slots in response to determining that the at least two PUCCHs carrying the HARQ-ACK information do not satisfy the timing sequence condition for multiplexing.

\* \* \* \* \*

UNITED STATES PATENT AND TRADEMARK OFFICE
CERTIFICATE OF CORRECTION

PATENT NO. : 12,308,969 B2
APPLICATION NO. : 17/768364
DATED : May 20, 2025
INVENTOR(S) : Mingju Li Page 1 of 1

It is certified that error appears in the above-identified patent and that said Letters Patent is hereby corrected as shown below:

In the Specification
In Column 4, Line 59, delete "referred to evolved" and insert -- referred to as evolved --, therefor.
In Column 5, Line 12, delete "enhanced Mobile Broadband (eMMB)," and insert -- enhanced Mobile Broadband (eMBB), --, therefor.

In the Claims
In Column 16, Line 49, in Claim 5, delete "onto PUCCH" and insert -- onto --, therefor.

Signed and Sealed this
Twenty-ninth Day of July, 2025

Coke Morgan Stewart
*Acting Director of the United States Patent and Trademark Office*